(12) United States Patent
He et al.

(10) Patent No.: US 8,805,669 B2
(45) Date of Patent: Aug. 12, 2014

(54) METHOD OF AND A SYSTEM FOR TRANSLATION

(75) Inventors: Yifan He, Shanghai (CN); Yanjun Ma, Dongying (CN); Andrew Way, Dublin (IE); Josef van Genabith, Dublin (IE)

(73) Assignee: Dublin City University, Dublin (IE)

( * ) Notice: Subject to any disclaimer, the term of this patent is extended or adjusted under 35 U.S.C. 154(b) by 603 days.

(21) Appl. No.: 13/182,281

(22) Filed: Jul. 13, 2011

(65) Prior Publication Data

US 2012/0016657 A1 Jan. 19, 2012

Related U.S. Application Data

(60) Provisional application No. 61/363,683, filed on Jul. 13, 2010.

(51) Int. Cl.
*G06F 17/28* (2006.01)

(52) U.S. Cl.
USPC ............. 704/2; 704/3; 704/4; 704/7; 704/8

(58) Field of Classification Search
CPC .................................. G06F 17/27; G06F 17/28
USPC ........................................... 704/2–8; 715/264
See application file for complete search history.

(56) References Cited

U.S. PATENT DOCUMENTS

| | | | | |
|---|---|---|---|---|
| 7,295,962 | B2 * | 11/2007 | Marcu ................................ | 704/2 |
| 8,244,519 | B2 * | 8/2012 | Bicici et al. ....................... | 704/2 |
| 2002/0188439 | A1 * | 12/2002 | Marcu ............................... | 704/5 |
| 2007/0271088 | A1 * | 11/2007 | Waibel et al. ..................... | 704/9 |
| 2008/0249760 | A1 * | 10/2008 | Marcu et al. ..................... | 704/2 |
| 2009/0012776 | A1 * | 1/2009 | Chino et al. ...................... | 704/7 |
| 2010/0138213 | A1 * | 6/2010 | Bicici et al. ...................... | 704/4 |
| 2010/0179803 | A1 * | 7/2010 | Sawaf et al. ..................... | 704/2 |
| 2011/0282643 | A1 * | 11/2011 | Chatterjee et al. ............... | 704/2 |
| 2011/0288852 | A1 * | 11/2011 | Dymetman et al. .............. | 704/4 |
| 2012/0232882 | A1 * | 9/2012 | Zhang ............................... | 704/2 |
| 2013/0144592 | A1 * | 6/2013 | Och et al. ......................... | 704/2 |

OTHER PUBLICATIONS

Lin et al., "A Note on Platt's Probablistic Outputs for Support Vector Machines," Machine Learning 68(3), Oct. 2007, 8 pages.

(Continued)

*Primary Examiner* — Lamont Spooner
(74) *Attorney, Agent, or Firm* — Seed IP Law Group PLLC (57) ABSTRACT

A translation system for translating source text from a first language to target text in a second language. The system comprises a translation memory (TM) module that stores translation segments. The TM module is operable to generate a TM target text output in response to source text. A statistical translation machine (SMT) module is configured to generate translations on the basis of statistical models whose parameters are derived from the analysis of bilingual text corpora. The SMT module is operable to generate a SMT target text output in response to source text. An extractor is configured to extract features from the TM target text output and the SMT target text output. A vector generator is configured to generate a vector with a unified feature set derived from the extracted features and features associated with the SMT module and the TM module. A recommender is operable to read the vector and determine whether the TM target text output or the SMT target text output is optimum for post editing.

30 Claims, 4 Drawing Sheets

(56) References Cited

OTHER PUBLICATIONS

Platt, "Probablistic Outputs for Support Vector Machines and Comparisons to Regularized Likelihood Methods," Advances in Large Margin Classifiers, 1999, pp. 61-74.

Specia et al., "Improving the Confidence of Machine Translation Quality Estimates," MT Summit XII, Ottawa, Canada, 2009, 8 pages.

Specia et al., "Estimating the Sentence-Level Quality of Machine Translation Systems," Proceedings of the 13$^{th}$ Annual Conference of the EAMT, Barcelona, Spain, May 2009, pp. 28-35.

Ueffing et al., "Confidence Measures for Statistical Machine Translation," Machine Translation Summit IX, New Orleans, Louisiana, Sep. 2003, pp. 394-401.

* cited by examiner

METHOD OF AND A SYSTEM FOR TRANSLATION

CROSS REFERENCE TO RELATED APPLICATION

This application claims the benefit, under 35 U.S.C. §119 (e), of U.S. Provisional Patent Application No. 61/363,683, filed Jul. 13, 2010, the contents of which are hereby incorporated by reference.

FIELD OF THE INVENTION

The present disclosure relates to a method of and a system for translation, and more particularly relates to a computer or machine translation of text or speech from one natural language to another using a translation system which includes a vector generating module which generates a numerical vector which is then used in determination of an appropriate translation methodology for effecting the translation.

BACKGROUND

Within the field of computational linguistics whereby computer software is used to translate from one language to another it is known to provide translation Memories (TM). These TMs are databases that store translated segments. The segments may be sentences or phrases that have been previously translated by human translators. The TM databases store the words, sentences, paragraphs and phrases that have already been translated which may be accessed by human translators to aid translation. TMs are typically used to assist translators and post-editors in a Computer Assisted Translation (CAT) environment by returning the most similar translated segments to avoid duplication of work in translation. The TM stores the source text and its corresponding translation (target text) in language pairs known as "translation units".

Another technique used in a Computer Assisted Translation (CAT) environment makes use of statistical machine translation (SMT) which is a machine translation method where translations are generated on the basis of statistical models whose parameters are derived from the analysis of bilingual text corpora. In linguistics, a corpora is a large and structured set of texts. The corpora which may be electronically stored and processed facilitates statistical analysis and hypothesis testing such as checking occurrences or validating linguistic rules. With the rapid development in SMT, machine translation (MT) systems are beginning to generate acceptable translations, especially in domains where abundant parallel corpora exist.

However advances in SMT are being adopted only slowly and sometimes somewhat reluctantly in professional localization and post-editing environments because of the usefulness of the TM, the investment and effort the company has put into TMs, and the lack of robust SMT confidence estimation measures which are as reliable as fuzzy match scores. Currently the localization industry relies on TM fuzzy match scores to obtain both a good approximation of post-editing effort and an estimation of the overall translation cost.

There is therefore a need for a translation system which addresses at least some of the drawbacks of the prior art.

SUMMARY

These and other problems are addressed by the provision of a translation system which effects a dynamic comparison of each of multiple different translation techniques and their efficacy in translating a body of work and then based on this comparison provides a computational output to assist in selection of one of the different techniques. In a preferred implementation the system includes a vector generating module which generates a numerical vector that is then fed into a recommender. The recommender outputs a recommendation that grades the performance of the MT module and the SMT module prior to post editing.

Accordingly, a first embodiment of the invention provides a translation system as detailed in claim 1. Such may be implemented in a computer assisted translation environment (CAT) as detailed in claim 15. Additionally, a method as detailed in claim 16 may be performed a processor-based system. Furthermore, an article of manufacturer as detailed in claim 17 may include processor executable instructions to implement the method. Advantageous embodiments are provided in the dependent claims.

These and other features will be better understood with reference to the followings Figures which are provided to assist in an understanding of the teaching of the various embodiments of invention.

BRIEF DESCRIPTION OF THE DRAWINGS

Embodiments of the present invention will now be described with reference to the accompanying drawings in which.

DETAILED DESCRIPTION OF THE DRAWINGS

Embodiments of the invention will now be described with reference to an exemplary translation system which is provided to assist in an understanding of the teaching of the invention.

Figure 1:
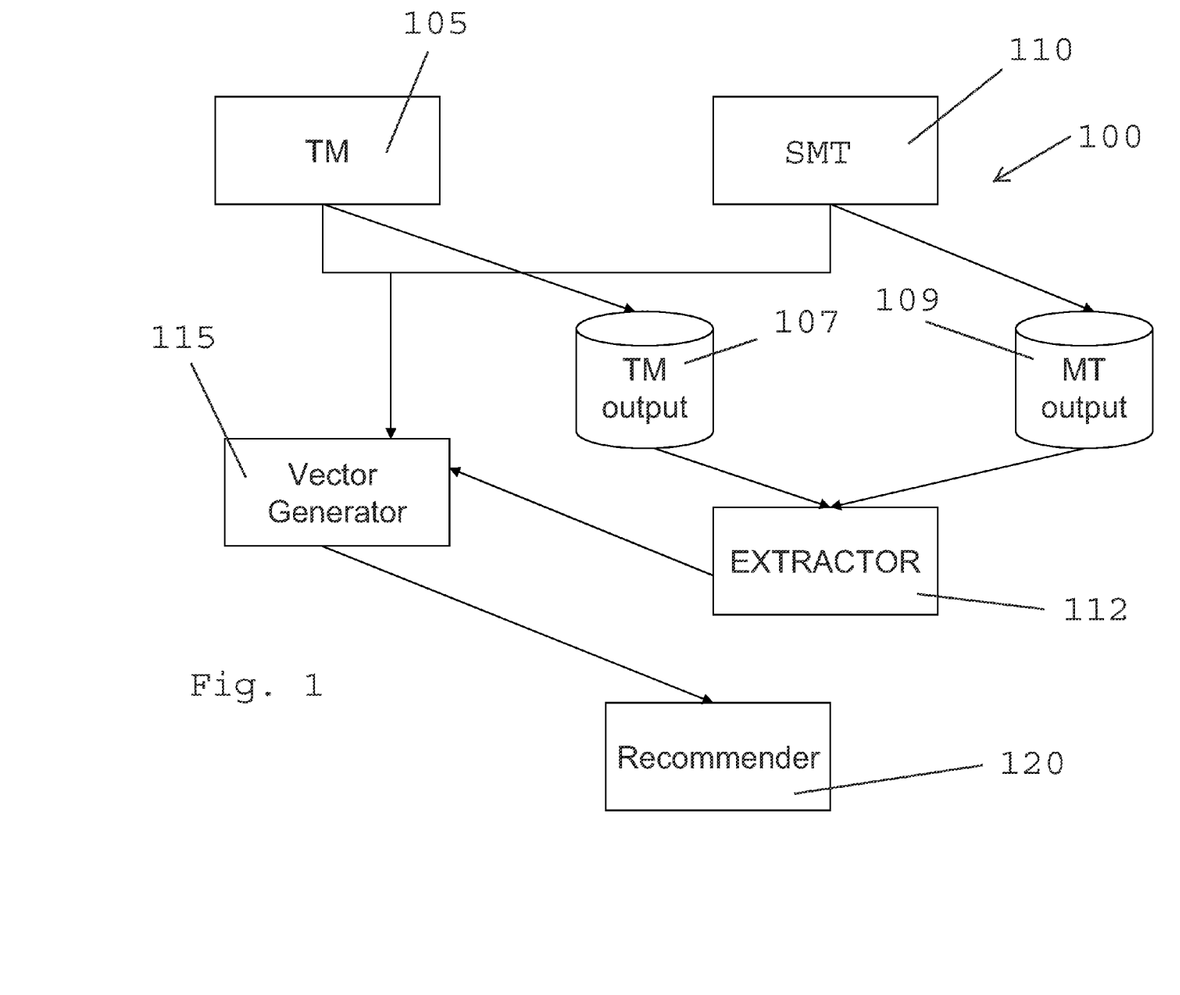
FIG. 1 is a block diagram representation of a translation system.

Referring to FIG. 1 there is illustrated a translation system 100 for translating source text from a first language to target text in a second language. The system 100 comprises a translation memory (TM) module 105 that stores translation segments and is operable to generate a TM target text output in response to a source text input. A statistical machine translation (SMT) module 110 is also provided which is configured to generate translations on the basis of statistical models whose parameters are derived from the analysis of bilingual text corpora. The SMT module 110 is operable to generate an SMT target text output in response to a source text input. The TM target text output is stored in database 107, and the SMT target text output is stored in database 109. An extractor 112 is operable to extract system independent features from the TM target text output and the SMT target text output. For example, three system independent features may be extracted from the TM target text output and three system independent features may be extracted from the SMT target text output. The system independent features are provided to the vector generator 115 which also receives features from each of the modules 105 and 110. The vector generator 115 generates a numerical vector from the combination of the TM features, the SMT features and the system independent features. The resultant vector is then fed into a recommender 120 which outputs a recommendation that grades the performance of each the TM module 105 and the SMT module 110 prior to post editing. The recommender 120 is programmed to predict the relative quality of the SMT output relative to the TM output and makes a recommendation on which output is better based on the comparison between the two outputs. In the exemplary embodiment, the recommender 120 is programmed to operate as a binary classifier.

The system 100 forms part of a computer assisted translation (CAT) environment. The operation of system 100 will now be described with reference to the flow chart of FIG. 2. An input string comprising the same source text that requires translation is input to each of the TM module 105 and the SMT module 110, step 130. The TM module 105 and the SMT module 110 are configured to provide a target text output on a sentence by sentence basis in response to receiving the source text. The TM module 105 and the SMT module 110 may operate at different speeds when translating the same source text. The vector generator 115 receives the 1-best output from the SMT module 110 and the 1-best hits with highest fuzzy match scores from the TM module 115 together with the system independent features from the extractor 112. The vector generator 115 generates a vector by combining the SMT features of the 1-best output from the SMT module 110, the fuzzy match score from the TM module 115 and the system independent features from the extractor 112, step 135. The extractor 112 waits for the completion of the target text output from each of the TM and SMT modules before commencing system independent features extraction. The vector generated by the vector generator 115 is then fed to the recommender 120, step 140. The recommender 120 at steps 145 and 150 determines whether the output from the TM module 105 or the SMT module 110 is optimum for post-editing. Post editing is performed at step 155 on the optimum output selected by the recommender 120. The recommender 120 recommends an SMT output to the post editor only when it is highly confident that it is better than the TM output, and otherwise it will recommend the TM output. The recommender 120 is configured to recommend the optimum output for each translated sentence from the TM and STM modules 105, 110 on a sentence by sentence basis.

The recommender 120 is trained to predict whether the SMT output or the TM output is more suitable for post-editing. Training and classifying is enabled by encoding both the output from the SMT module 110 and the output from the TM module 105 into a single combined feature vector, which describes the characteristics of the SMT and TM outputs, along with a binary label, which determines which output is more suitable for post-editing (either MT or S™). For example, in an exemplary embodiment a 'label 1' indicates SMT is better than TM and a 'label −1' indicates TM is better than SMT. In training, both the feature vector and the label are known so that the recommender 120 may be trained. In operation after training, only the features vector are known and the recommender 120 is operable to assign a label to the feature vector based on knowledge learned during training as described in more detail below.

In the exemplary embodiment, the recommender 120 is configured to operate as a Support Vector Machine (SVM) that is programmed to predict the relative quality of the SMT output relative to the TM output to make a recommendation. The vector generating module 115 generates a vector with a unified feature set with features extracted from the both the SMT module 110 and the TM module 105 together with additional linguistic/posterior system independent features so that the recommender (binary classifier) can estimate whether the SMT output is better than the hit from the TM module 105. The extractor 112 encodes the target text outputs from the TM module 105 and the SMT module 110 into numerical values. A translation edit rate (TER) score may be used to approximate the quality of the TM and the SMT outputs. The TER score is a measure of how an MT or a SMT output is similar to a human-translated reference translation, it combines the number of insertion, deletion, substitution and shift operations required in order to transform the MT or TM output into a correct translation of a source sentence. Initially (in training), a TER score is computed for both the MT and SMT outputs and a label is assigned, for example, i.e. if the TER score of MT is lower, label '1' is assigned otherwise label '−1' is assigned. After the labelling operation the vector generator 115 combines the TM and the SMT features into a single vector. This feature vector is associated with a label in training the binary classifier 120. The features are used in determining when an MT or SMT output should be recommended. The post-editing effort is measured by the TER score. From training examples, human translations are known for each input. The TER score is calculated between the human translation and MT output (Score 1), and between the human translation and the STM output (Score 2). If score 1 is greater than score 2, the corresponding vector is labelled −1, otherwise the corresponding vector is labelled +1. It will be appreciated that as the TER is counting errors that the smaller the error the better the score.

The binary classifier 120 is configured to classify an input based on decision rules which minimize the regularised error function. An example of such a rule is:

$$\min_{\omega, b, \xi} \frac{1}{2} w^T w + C \sum_{i=1}^{l} \xi_i \qquad (1)$$

$$\text{s.t. } y_i(w^T \phi(x_i) + b) \geq 1 - \xi_i$$

$$\xi_i \geq 0$$

Where $$(X_i, X_j) \in R^n X \{+1, -1\}$$

are l training instances that are mapped by the higher dimensional space, w is the weight vector, $\epsilon$ is the relaxation variable and C>0 is the penalty parameter.

Solving SVMs is viable using for example the 'kernel trick': finding a kernel function K in equation (1) with $$K(X_i, X_j) = \phi(X_i)^\gamma \phi(X_j)$$

Given the feature vectors (x) together with their labels (y), the SVM training algorithm will try to find a weight vector (w), which minimizes recommendation error on the training data and at the same time keeps the generalisability on unseen data, as in Equation (1). When the recommender 120 reads a new feature vector x' after the training phase is completed it computes a real value y'=wTx'. Based on the value y', a label +1 is assigned to the new input vector x' if y'>0, and a label −1 to the vector x' otherwise.

The experiments are performed with the Radial Basis Function (RBF) kernel, as in equation (2):

$$K(x_i, x_j) = \exp(-\gamma \|x_i - x_j\|^2), \gamma > 0 \qquad (2)$$

When using SVMs with the RBF kernel, there are two free parameters to tune i.e. the cost parameter C in equation (1) and the radius parameter 7 in equation (2). The parameter C is used to determine the balance of accuracy on the training data and the generalizability of the classifier 120 on unseen data. The parameters C and γ are optimized by a brute-force grid search. The classification result of each set of parameters is evaluated by cross validation on the training set. The classifier 120 predicts the relative quality of the SMT output to make a recommendation.

The recommender 120 uses features from the SMT module 110, the TM module 105 and additional linguistic features to estimate whether the SMT output is better than the hit from the TM module 105. The system 100 treats translation recommendation as a binary classification problem. There is a pair of outputs from the TM and SMT for each sentence. Ideally the classifier 120 will recommend the output that needs less post-editing effort. The vector generator 115 uses automatic TER scores as the measure for the required post-editing effort. It will be appreciated that in the 'training' step, the vector generator uses TER scores to measure post-editing effort which requires correct human translations to produce TER scores. The training step is a one-pass process and once completed a labeling model may be used to produce labels for the vector, so that recommendation may be performed on unseen and un-translated segments. The vector generator 115 labels the training examples as in equation (3):

$$y = \begin{cases} +1 & \text{if } TER(MT) < TER(TM) \\ -1 & \text{if } TER(MT) \geq TER(TM) \end{cases} \quad (3)$$

The SMT and TM features are obtained directly by the vector generator 115 from the TM module 105 and the SMT module 110, respectively. The system independent features are extracted by the extraction module 112 from the SMT and TM target text outputs. The vector generator 115 combines the SMT features, the TM features and the system independent features together and generates a vector. Each instance is associated with a set of features from both the SMT and TM outputs. The recommender 120 uses three types of features in the classification phrase i.e. the MT module features, the TM module features and system independent features. The SMT module features are those typically used in SMT, namely the phrase-translation model scores, the language model probability, the distance-based reordering score, the lexicalized reordering model scores, and the word penalty.

The TM feature is the fuzzy match cost of the TM hit. The calculation of fuzzy match score itself is one of the core technologies in TM systems and varies among different vendors. In this exemplary embodiment, the fuzzy match cost score is computed as the minimum Edit Distance between the source and TM entry, normalized by the length of the source as in equation 4.

$$h_{fm}(t) = \min_e \frac{EditDistance(s, e)}{Len(s)} \quad (4)$$

where s is the source side of t, the sentence to translate, and e is the source side of an entry in the TM. For fuzzy match scores F, this fuzzy match cost $h_{fm}$ roughly corresponds to 1−F. The difference in calculation does not influence classification, and allows direct comparison between a pure TM system and a translation recommendation system.

The system independent features are features that are independent of the TM module 105 and the SMT module 110. The system independent features are useful when a third-party translation service is used or the MT system is simply treated as a black-box. These features include source and target side language model (LM) scores, pseudo source fuzzy match scores and IBM model 1 scores.

The language model (LM) score and perplexity of the input source sentence are computed using an LM trained on the source-side training data of the SMT system. The inputs that have lower perplexity or higher LM score are more similar to the dataset on which the SMT system is built.

The LM probability and perplexity of the target side are computed as a measure of fluency. Language model perplexity of the SMT outputs are calculated and LM probability is already part of the SMT systems scores. LM scores on TM outputs are also computed, though they are not as informative as scores on the SMT side, since TM outputs should be grammatically perfect.

The output is translated back to obtain a pseudo source sentence. The fuzzy match score is computed between the original source sentence and this pseudo-source. If the SMT/TM system performs well enough based on theoretical analysis these two sentences should be the same or very similar. Therefore, the fuzzy match score here gives an estimation of the confidence level of the output. This score is computed for both the SMT output and the TM hit.

The fuzzy match score does not measure whether the hit could be a correct translation, i.e. it does not take into account the correspondence between the source and target, but rather only the source-side information. For the TM hit, the IBM Model 1 score serves as a rough estimation of how good a translation it is on the word level for the SMT output, on the other hand, it is a black-box feature to estimate translation quality when the information from the translation model is not available. Bidirectional (source-to-target and target-to-source) model 1 scores on both TM and SMT outputs are also computed.

The quality of the classification is measured by 'precision' and 'recall'. Let A be the set of recommended SMT outputs, and B be the set of SMT outputs that have lower TER than TM hits. Precision P, recall R and F-value as defined as in equation (5):

$$P = \frac{|A \cap B|}{|A|}, \quad R = \frac{|A \cap B|}{|B|} \text{ and } F = \frac{2PR}{P + R} \quad (5)$$

In Table 1, the recommender 120 reports recommendation performance using SMT and TM system features (SYS), system features plus system-independent features (ALL: SYS+SI), and system-independent features only (SI).

TABLE 1

Recommendation Results

|  | Precision | Recall | F-Score |
| --- | --- | --- | --- |
| SYS | 82.53 ± 1.17 | 96.44 ± 0.68 | 88.95 ± .56 |
| SI | 82.56 ± 1.46 | 95.83 ± 0.52 | 88.70 ± .65 |
| ALL | 83.45 ± 1.33 | 95.56 ± 1.33 | 89.09 ± .24 |

From Table 1, it may be observe that SMT and TM system-internal features are very useful for producing a stable (as indicated by the smaller confidence interval) recommendation system (SYS). Interestingly, only using some simple system external features can also yield a system with reasonably good performance (SI). The performance of the recommender 120 can be further boosted by adding more syntactic and semantic features. Combining all the system internal and external features leads to limited gains in Precision and F-score compared to using only system-internal features (SYS) only. This indicates that at the default confidence level, current system-external features can only play a limited role in informing the system when current system-internal features are available.

By combing both system-internal and system-external features it is possible to yield higher, more stable precision when adjusting the confidence levels of the recommender 120. Additionally, the performance of system SI is promising given the fact that a limited number of simple features are used, which demonstrates a good prospect of applying the system 100 to MT systems where access to their internal features is not available.

Table 1 shows that classification recall is very high, which suggests that precision can still be improved, even though the F-score is not low. Considering that TM is the dominant technology used by post-editors, a recommendation to replace the hit from the TM would require more confidence, i.e. higher precision. Ideally the aim is to obtain a level of 0.9 precision at the cost of some recall, if necessary. This goal may be achieved using two methods.

In a first methodology the training data may be tuned with different margins on the training data to tune precision and recall in order to obtain a desired balance. In the basic case, the training example would be marked as in equation (3). By labelling both the training and test sets with this rule, the accuracy of the prediction will be maximized. Higher precision may be achieved by enforcing a larger bias towards negative examples in the training set so that some borderline positive instances would actually be labelled as negative, and the recommender would have higher precision in the prediction stage as in equation (6).

$$y = \begin{cases} +1 & \text{if } TER(SMT) + b < TER(TM) \\ -1 & \text{if } TER(SMT) + b \geq TER(TM) \end{cases} \quad (6)$$

By varying b in [0, 0.25] using MT system features and TM features it is possible to tune the system. Results are reported in Table 2.

TABLE 2

| Classifier margins | | |
| --- | --- | --- |
| | Precision | Recall |
| TER + 0 | 83.45 ± 1.33 | 95.56 ± 1.33 |
| TER + 0.05 | 82.41 ± 1.23 | 94.41 ± 1.01 |
| TER + 0.10 | 84.53 ± 0.98 | 88.81 ± 0.89 |
| TER + 0.15 | 85.24 ± 0.91 | 87.08 ± 2.38 |
| TER + 0.20 | 87.59 ± 0.57 | 75.86 ± 2.70 |
| TER + 0.25 | 89.29 ± 0.93 | 66.67 ± 2.53 |

The highest accuracy and F-value is achieved by TER+0, as all other settings are trained on biased margins. Except for a small drop in TER+0.05, other configurations all obtain higher precision than TER+0. It was noted that it is possible to obtain 0.85 precision without a big sacrifice in recall with b=0.15, but for larger improvements on precision, recall will drop more rapidly. When b is moved beyond 0.25, the margin becomes less reliable, as the number of positive examples becomes too small. In particular, this causes the SVM parameters that are tuned on in the first fold to become less applicable to the other folds. This is a limitation of using biased margins to obtain high precision.

Figure 3:
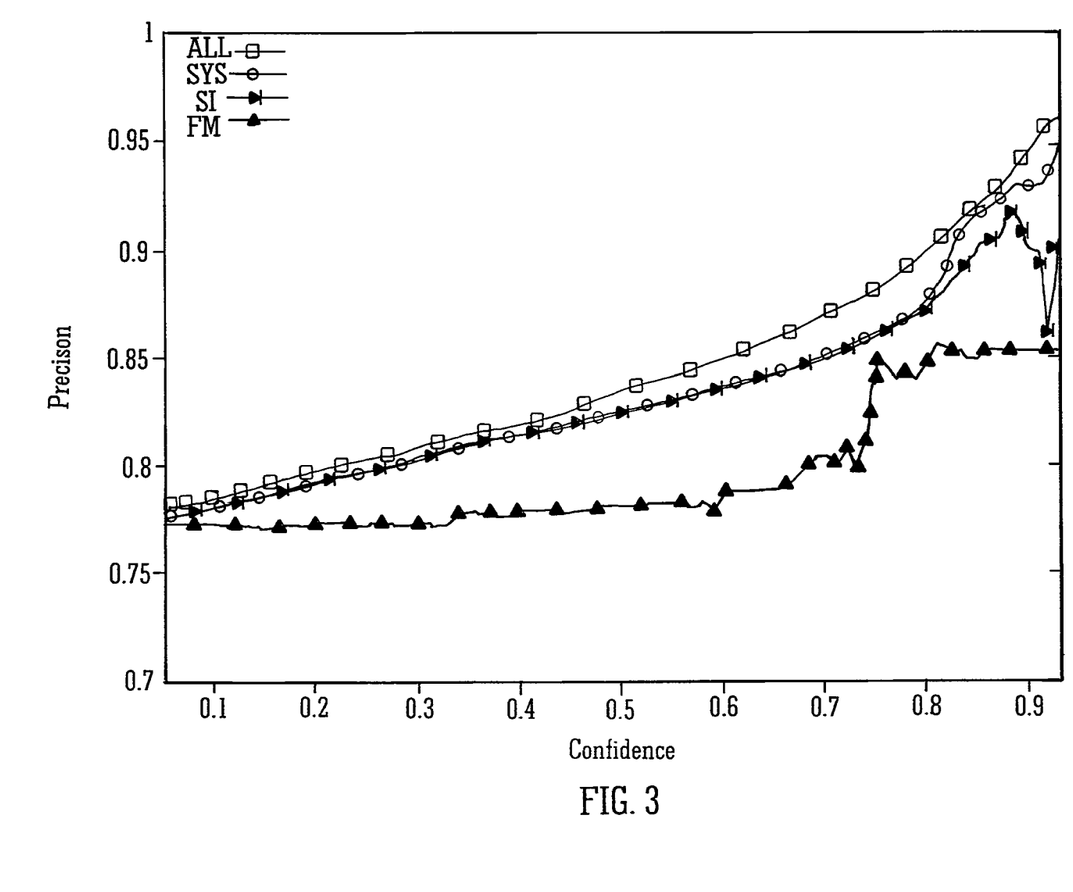
FIG. 3 is a graph illustrating precision changes versus confidence levels.

An alternative technique to using a biased margin is to output a confidence score during prediction and to threshold on the confidence score. It is also possible to add this method to the SVM model trained with a biased margin. The SVM confidence estimation techniques may be used to obtain the confidence level of the recommendation, and change the confidence threshold for recommendation when necessary. This also allows a direct comparison against a simple baseline inspired by TM users. In a TM environment, some users simply ignore TM hits below a certain fuzzy match score F (usually from 0.7 to 0.8). This fuzzy match (FM) score reflects the confidence of recommending the TM hits. To obtain the confidence of recommending an SMT output, the baseline FM uses fuzzy match costs $h_{FM} \approx 1-F$ for the TM hits as the level of confidence. In other words, the higher the fuzzy match cost of the TM hit is (lower fuzzy match score), the higher the confidence of recommending the SMT output. The baseline is compared with the three settings The graph of FIG. 3 shows that the precision curve of FM is low and flat when the fuzzy match costs are low (from 0 to 0.6), indicating that it is unwise to recommend an SMT output when the TM hit has a low fuzzy match cost (corresponding to higher fuzzy match score, from 0.4 to 1). It was observed that the precision of the recommendation receives a boost when the fuzzy match costs for the TM hits are above 0.7 (fuzzy match score lower than 0.3), indicating that SMT output should be recommended when the TM hit has a high fuzzy match cost (low fuzzy match score). With this boost, the precision of the baseline system can reach 0.85, demonstrating that a proper thresholding of fuzzy match scores can be used effectively to discriminate the recommendation of the TM hit from the recommendation of the SMT output.

However, using the TM information only does not always find the easiest-to-edit translation. For example, an excellent SMT output should be recommended even if there exists a good TM hit (e.g. fuzzy match score is 0.7 or more). On the other hand, a misleading SMT output should not be recommended if there exists a poor but useful TM match (e.g. fuzzy match score is 0.2).

The system 100 is able to tackle these complications as it incorporates features from the MT and the TM systems 105, 110 simultaneously. FIG. 3 shows that both the SYS and the ALL setting consistently outperform FM. The SI feature set does not perform well when the confidence level is set above 0.85. This may indicate that this feature set is not reliable enough to extract the best translations. However, when the requirement on precision is not that high, and the MT-internal features are not available, it would still be desirable to obtain translation recommendations with these black-box features. The difference between SYS and ALL is generally small, but ALL performs steadily better in [0.5, 0.8].

TABLE 3

| Recall at Fixed Precision | |
| --- | --- |
| | Recall |
| SYS @ 85PREC | 88.12 ± 1.32 |
| SYS @ 90PREC | 52.73 ± 2.31 |
| SI @ 85PREC | 87.33 ± 1.53 |
| ALL @ 85PREC | 88.57 ± 1.95 |
| ALL @ 90PREC | 51.92 ± 4.28 |

In Table 3 the recall scores are represented at 0.85 and 0.9 precision for SYS, SI and ALL models to demonstrate that the system's performance when there is a hard constraint on precision. Note that the system 100 will return the TM entry when there is an exact match, so the overall precision of the system is above the precision score that is set in a mature TM environment, as a significant portion of the material to be translated will have a complete match in the TM system.

In the exemplary arrangement three sets of system-independent features are suggested: features based on the source- and target-side language model (LM), the IBM Model 1 (MI) and the fuzzy match scores on pseudo-source (PS).

In this application a classification model integrates SMT into a TM system, in order to facilitate the work of post-editors. In so doing the application addresses the problem of MT quality estimation as binary prediction instead of regression. From the post-editors' perspective, they can continue to work in their familiar TM environment, use the same cost estimation methods, and at the same time benefit from the power of SMT. SVMs are used to make these predictions, and use grid search to find better RBF kernel parameters. Features from inside the MT system, from the TM, as well as features that make no assumption on the translation model are explored for the binary classification. With these features it is possible to make glass-box and black-box predictions. Glass-box predictions use features that are read directly from the MT and STM modules. Black-box predictions use features that are extracted from the MT and STM outputs without accessing the modules.

It will be understood that what has been described herein is an exemplary translation system. While the present application has been described with reference to exemplary arrangements it will be understood that it is not intended to limit the teaching of the present application to such arrangements as modifications can be made without departing from the spirit and scope of the application.

It will be understood that while exemplary features of a system and methodology in accordance with the teaching of the invention have been described that such an arrangement is not to be construed as limiting the invention to such features. A method of and a system for translation in accordance with the present teaching can be implemented in software, firmware, hardware, or a combination thereof. In one mode, a method of and a system for translation is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. Therefore, the server or computer 190 as described with reference to FIG. 4 may be considered as representative of any computer(s) in which the method of and a system for translation resides or partially resides.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

Figure 4:
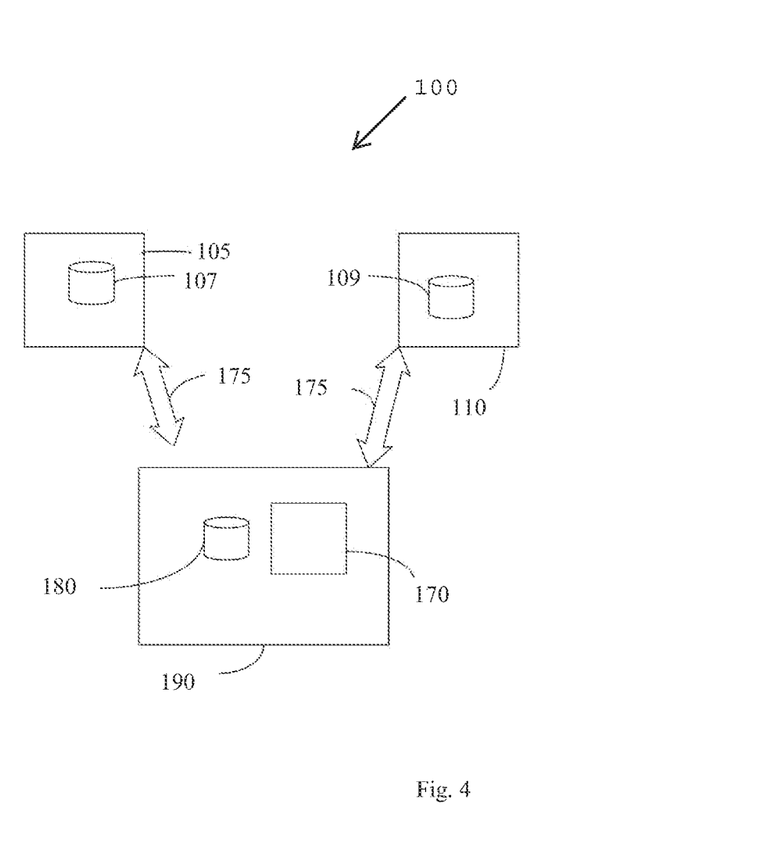
FIG. 4 is a block diagram representation of the translation system of FIG. 1.

The processor(s) 170 may be programmed to perform the functions of the extractor 112, the vector generator 115 and the recommender 120. The processor(s) 170 is a hardware device for executing software, particularly software stored in memory. Processor(s) 170 can be any custom made or commercially available processor, a central processing unit (CPU), an auxiliary processor among several processors associated with a computer, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., or a 68xxx series microprocessor from Motorola Corporation. Processor 170 may also represent a distributed processing architecture such as, but not limited to, SQL, Smalltalk, APL, KLisp, Snobol, Developer 200, MUMPS/Magic.

Memory 180 is associated with processor(s) 170 and is operable to receive data 175 from the TM module 105 and the SMT module 110. Memory 180 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s) 170.

The software in memory 180 may include one or more separate programs. The separate programs comprise ordered listings of executable instructions for implementing logical functions. In the example of heretofore described, the software in memory includes the one or more components of the method of and a system for translation and is executable on a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system essentially controls the execution of other computer programs, such as the that provided by the present teaching, and provides scheduling, input-output control, file and data management, memory management, and communication control and related services.

The system 100 provided in accordance with the present teaching may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

The I/O devices and components of the computer may include input devices, for example but not limited to, input modules for PLCs, a keyboard, mouse, scanner, microphone, touch screens, interfaces for various medical devices, bar code readers, stylus, laser readers, radio-frequency device readers, etc. Furthermore, the I/O devices may also include output devices, for example but not limited to, output modules for PLCs, a printer, bar code printers, displays, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, and a router.

Figure 2:
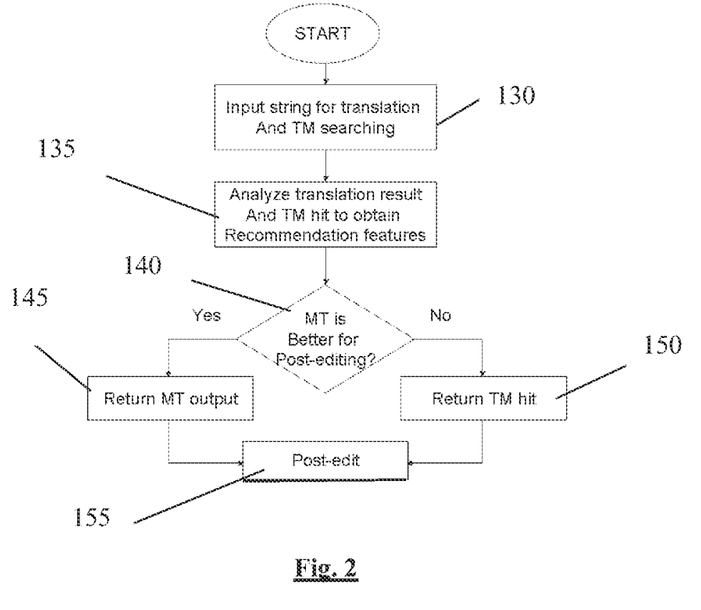
FIG. 2 is a flow chart illustrating the translation system of FIG. 1 in operation.

When the method of and a system for translation is implemented in software, for example processing the methodology provided in FIG. 2, it should be noted that such software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Such an arrangement can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Any process descriptions or blocks in Figures, such as FIG. 1, 2 or 4, should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present teaching, particularly, any "preferred" embodiments, are possible examples of implementations, merely set forth for a clear understanding of the principles. Many variations and modifications may be made to the above-described embodiment(s) without substantially departing from the spirit and principles of the invention. All such modifications are intended to be included herein within the scope of this disclosure and the present invention and protected by the following claims.

Although certain example methods, apparatus, systems and articles of manufacture have been described herein, the scope of coverage of this application is not limited thereto. On the contrary, this application covers all methods, systems, apparatus and articles of manufacture fairly falling within the scope of the appended claims.

The words comprises/comprising when used in this specification are to specify the presence of stated features, integers, steps or components but does not preclude the presence or addition of one or more other features, integers, steps, components or groups thereof.

The invention claimed is:

1. A translation system for translating source text from a first language to target text in a second language, the system comprising:
    at least one processor; and
    at least one nontransitory processor-readable medium that stores processor executable instructions and information, which includes:
    a translation memory (TM) module storing translation segments; the TM module being operable to generate a TM target text output in response to the source text,
    a statistical machine translation (SMT) module configured to generate translations on the basis of statistical models, the statistical models each having a respective number of parameters derived from the analysis of bilingual text corpora; the SMT module being operable to generate a SMT target text output in response to the source text,
    the at least one processor communicatively coupled to the at least one nontransitory processor-readable medium and which in response to the execution of the processor executable instructions implements:
    an extractor configured to extract system independent features from the TM target text output and the SMT target text output,
    a vector generator configured to generate a vector with a unified feature set derived from the extracted features and features obtained directly from each of the SMT module and the TM module, and
    a recommender operable to read the vector and determine whether the TM target text output or the SMT target text output is optimum for post editing.

2. A system as claimed in claim 1, wherein the extractor is configured to encode the TM target text output into numerical values.

3. A system as claimed in claim 1, wherein the extractor is configured to encode the SMT target text output into numerical values.

4. A system as claimed in claim 1, wherein the extracted features are encoded into numerical values.

5. A system as claimed in claim 1, wherein the extracted features are calculated.

6. A system as claimed in claim 5 wherein the TM target text output and the SMT target text output are accessible.

7. A system as claimed in claim 1, wherein the extracted features include at least one of: a number of source and target side LM scores, a number of pseudo source fuzzy match scores, or a number of IBM model 1 scores.

8. A system as claimed in claim 1, wherein the vector generator receives a fuzzy match score associated with the TM module.

9. A system as claimed in claim 8, wherein the fuzzy match score provides one of the features in the generated vector.

10. A system as claimed in claim 1, wherein the vector generator receives at least one of the following features from the SMT module: a phrase-translation model score, a language model probability score, a distance-based reordering score, a lexicalized reordering model score, or a word penalty.

11. A system as claimed in claim 1, wherein the vector generator is operable to label the TM target text output and the SMT target text output.

12. A system as claimed in claim 11, wherein the label includes a numerical value.

13. A system as claimed in claim 12, wherein the vector generator labels the TM target text output and the SMT target text output based on a measure of the post-editing effort.

14. A system as claimed in claim 12, wherein the measure includes a number of translation edit rate (TER) scores.

15. A system as claimed in claim 1 wherein the system is a Computer Assisted Translation (CAT) environment.

16. A method of for translating source text from a first language to target text in a second language, the method comprising:
   generating a translation memory (TM) target text output in response to the source text via at least one processor,
   generating a statistical machine translation (SMT) target text output in response to the source text via the at least one processor,
   extracting system independent features from the TM target text output and the SMT target text output via at least one processor,
   generating a vector with a unified feature set derived from the extracted features and features obtained directly from the SMT module and the TM module via the at least one processor, and
   reading the vector to determine whether the TM target text output or the SMT target text output is optimum for post editing.

17. An article of manufacture in the form of a nontransitory processor-readable medium that stores machine readable instructions which, when executed, cause a machine to:
   generate a translation memory (TM) target text output in response to a source text input,
   generate a statistical machine translation (SMT) target text output in response to the source text input,
   extract system independent features from the TM target text output and the SMT target text output,
   generate a vector with a unified feature set derived from the extracted features and features obtained directly from the SMT module and the TM module, and
   read the vector to determine whether the TM target text output or the SMT target text output is optimum for post editing.

18. An article of manufacture as defined in claim 17, wherein the machine readable instructions further cause the machine to encode the TM target text output into numerical values.

19. An article of manufacture as defined in claim 17, wherein the machine readable instructions further cause the machine to encode the SMT target text output into numerical values.

20. An article of manufacture as defined in claim 17, wherein the machine readable instructions further cause the machine to encode the extracted features into numerical values.

21. An article of manufacture as defined in claim 17, wherein the machine readable instructions further cause the machine to calculate the extracted features.

22. An article of manufacture as defined in claim 17, wherein the machine readable instructions further cause the machine to access the TM target text output and the SMT target text output.

23. An article of manufacture as defined in claim 17, wherein the machine readable instructions further cause the machine to extract features which include at least one of: a number of source and target side LM scores, a number of pseudo source fuzzy match scores, or a number or IBM model 1 scores.

24. An article of manufacture as defined in claim 17, wherein the machine readable instructions further cause the machine to receive a fuzzy match score associated with the TM module.

25. An article of manufacture as defined in claim 24, wherein the machine readable instructions further cause the machine to include the fuzzy match score in the generated vector.

26. An article of manufacture as defined in claim 17, wherein the machine readable instructions further cause the machine to receive at least one of the following features from the SMT module: a number of phrase-translation model scores, a number of language model probability score, a number of distance-based reordering scores, a number of lexicalized reordering model scores, or a word penalty.

27. An article of manufacture as defined in claim 17, wherein the machine readable instructions further cause the machine to label the TM target text output and the SMT target text output.

28. An article of manufacture as defined in claim 27, wherein the machine readable instructions further cause the machine to label using a numerical value.

29. An article of manufacture as defined in claim 28, wherein the machine readable instructions further causes the machine to label the TM target text output and the SMT target text output based on a measure of a post-editing effort.

30. An article of manufacture as defined in claim 29, wherein the machine readable instructions further cause the machine to measure the post-editing effort using a number of translation edit rate (TER) scores.

* * * * *